United States Patent [19]
Beauchemin, Jr.

[11] Patent Number: 6,047,949
[45] Date of Patent: Apr. 11, 2000

[54] PROGRAMMABLE FLUID FLOW CONTROL VALVE

[76] Inventor: George A. Beauchemin, Jr., 3294 Via Loma, Fallbrook, Calif. 92028-9333

[21] Appl. No.: 09/158,017

[22] Filed: Sep. 21, 1998

[51] Int. Cl.⁷ ..................................................... F16K 31/44
[52] U.S. Cl. ........................... 251/257; 251/218; 251/251
[58] Field of Search ..................................... 251/230, 215, 251/218, 226, 251, 257, 258, 259, 262

[56] References Cited

U.S. PATENT DOCUMENTS

| | | | |
|---|---|---|---|
| 1,758,419 | 5/1930 | Wheaton | 251/259 |
| 2,108,534 | 2/1938 | Herrmann | 251/259 |
| 3,183,934 | 5/1965 | Miner | 251/259 |
| 4,067,358 | 1/1978 | Streich | 251/230 |

*Primary Examiner*—David J. Walczak
*Attorney, Agent, or Firm*—Frank D. Gilliam

[57] ABSTRACT

A fluid flow control valve which is mechanically programmable to enable the control of flow rate and/or timing of the supply of fluid therethrough. The valve comprises a housing having an inlet and outlet portion. An axially extending passageway within the housing is in fluid communication with the inlet portion. A fluid flow control and timing mechanism is disposed within the axially extending passageway and configured to travel a defined path(s) along the axis thereof when pressurized fluid is supplied to the passageway. The fluid flow control and timing mechanism is configured to cooperate with the outlet portion to control the timing and flow rate of fluid therethrough. To enable the flow control mechanism to traverse the defined path(s) of travel, a biasing mechanism is associated with the fluid flow control and timing mechanism to respond to the application of pressurized fluid into the axially extending passageway. The invention provides a mechanically programmable valve which is particularly useful for controlling the flow of fluids without the need for electrically actuated control systems.

30 Claims, 4 Drawing Sheets

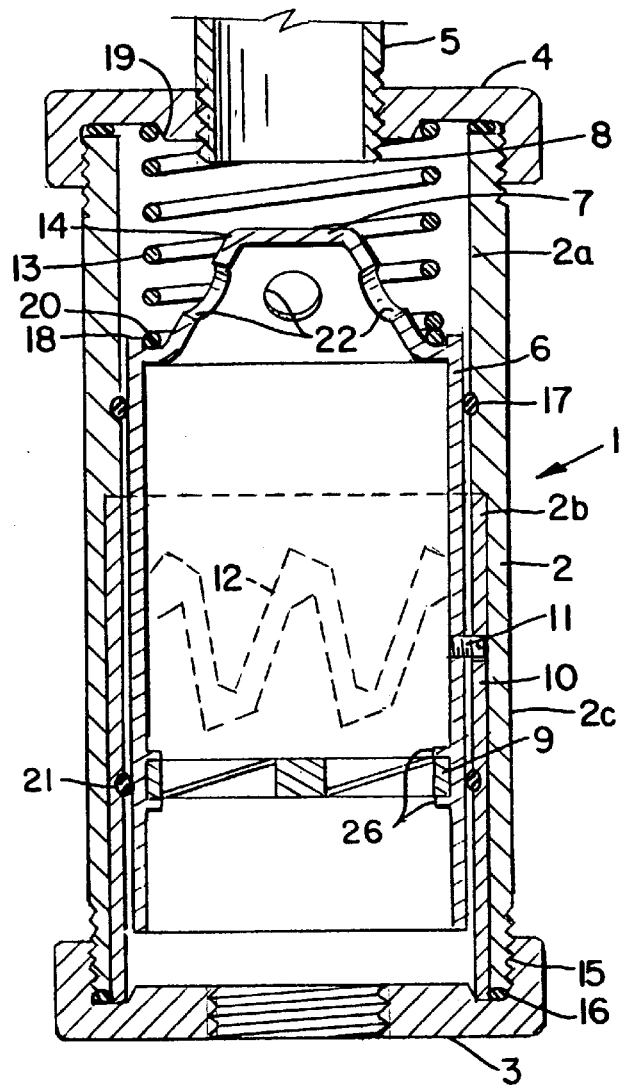

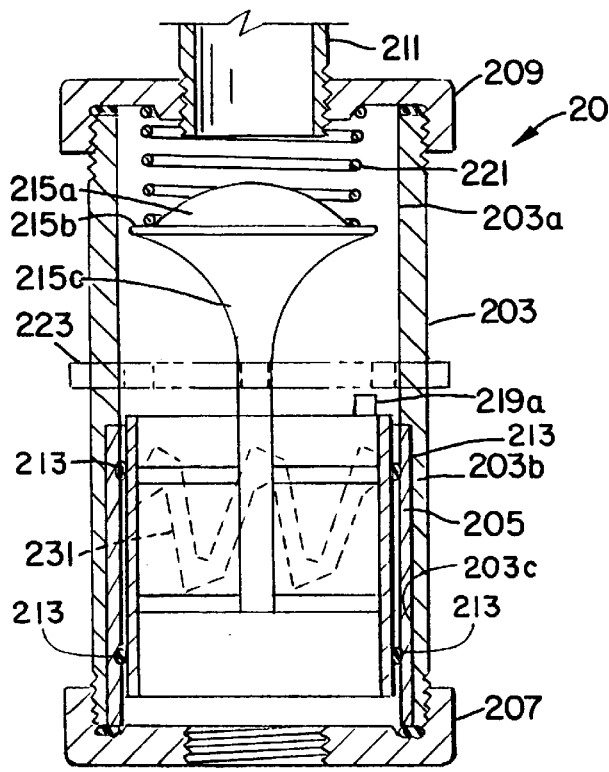
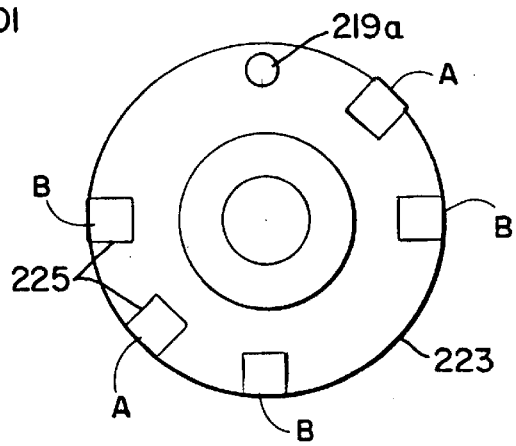
Fig.10
Fig.12
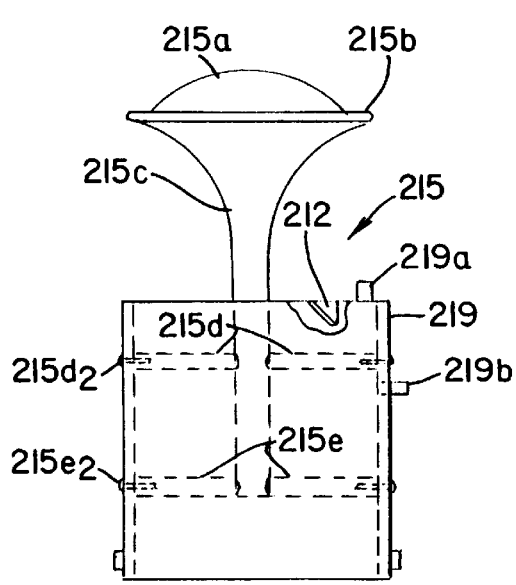
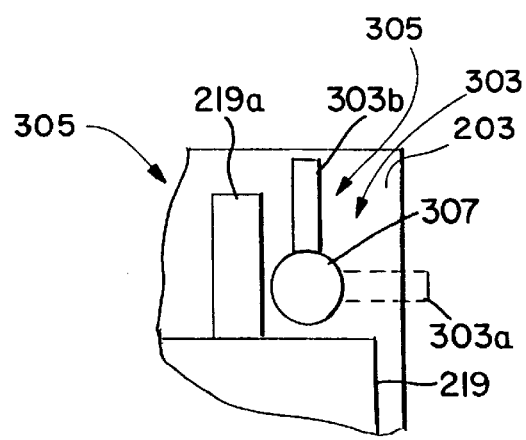
Fig.11
Fig.13

PROGRAMMABLE FLUID FLOW CONTROL VALVE

FIELD OF THE INVENTION

The present invention is directed to a fluid flow control valve. More particularly, the present invention is directed to a mechanically programmable fluid flow control valve which controls the rate and/or timing of fluid flow through one or more outlets.

BACKGROUND OF THE RELEVANT ART

Pressurized fluid distribution systems are used in a wide variety of industries, such as oil pipelines that distribute oil removed from the ground to supply tankers; commercial irrigation systems employed by large farms to supply water from the well to the crop fields; lawn watering systems used by homeowners to maintain lush, green lawns and healthy, decorative plantings and the like. In all of such systems, remote valves are employed to control the flow rate and/or timing of the supply of fluid to segments or "zones" of the system such as, for example, to different parts of a crop field in plant irrigation. The remote valves or zone valves are also used in conjunction with nozzles or "heads" that directly supply the water to the plants to control the supply of water thereto. The use of zone valves and heads in combination is employed in lawn irrigation systems which may include a plurality of zones. Each zone receives water from a number of heads having a common zone valve.

In most instances, the zone valves supplying fluid to the different segments or zones of a fluid distribution system are operated by electronic or pneumatic signals received from a central location. The signals actuate a motor or solenoid associated with the zone valve to control the flow and/or timing of fluid therethrough to the zone. Such valves not only are more complicated in their design and operation, but also require the use of electrical wires or pneumatic control piping which run from the central signal generating location to the valve. As a result, the additional equipment, installation time and associated fixed, installation and operating costs reduce the utility of these systems. Such is particularly the situation in areas of the world where utilities such as electricity or pressurized gas are scarce, or the distribution systems are less well developed.

Another problem associated with zone valves is providing adequate water pressure from the water source to the zone valve. The greater the number of zones that is to be irrigated, the greater the number of outlets or valves in the pipe line which supplies the water. The more outlets added to the pipe line, the greater the chances are that there may be an inadequate pressure drop at many of the valves along the pipe line. Thus, a number of zones may not receive an adequate supply of water.

Unlike the centrally controlled zone valves used in fluid distribution systems, the zone valves associated with the final outlets or nozzles are not controllable as to rate and/or timing but rather operate merely to raise the nozzle to a height intended to ensure that water supplied to the nozzle is distributed by the nozzle to a predetermined area of the field to be irrigated. Alternatively, some zone valves are designed to interrupt the flow of water to an outlet which has no associated nozzle as disclosed in U.S. Pat. No. 5,372,306.

U.S. Pat. No. 4,632,361 to Callison discloses a fluid control valve which purports to perform a preestablished sequence of flow rates and timing schedules in response to pressure pulses in a controlled fluid. As disclosed, pressurized fluid causes an actuation mechanism, a plate or cylinder, to rotate along a path defined by a cam and cam follower arrangement such that fluid ports defined in the plate or cylinder of predetermined size and placement come into and out of fluid communication with the inlet and outlet ports of the valve, thus enabling the control of the fluid flow rate and/or timing. The '361 patent also discloses that a plurality of control surfaces may be substituted to select a large number of fluid flow schedules and flow rates. A disadvantage of the Callison valve is the many parts which increases the cost of the valve, and compromises the valve's reliability.

Although there is a fluid flow control valve that purports to control fluid flow and timing, there is still a need in the art of fluid flow distribution an inexpensive, reliable, programmable, fluid flow control valve capable of controlling flow rate and/or timing of fluid passing through the valve. There is also a need for a programmable, fluid flow control valve capable of supplying fluid to a number of zones without the problem of an inadequate pressure drop.

An objective of the present invention is to provide a programmable fluid flow control valve capable of controlling flow rate and/or timing of fluid passing through the valve.

Another objective of the present invention is to provide a programmable fluid flow control valve capable of supplying fluid to a number of segments or zones.

A further object of the present invention is to eliminate or reduce the problem of inadequate pressure drop in a valve when providing fluid to a number segments or zones.

Other objects and advantages of the present invention will become apparent to those skilled in the art upon practicing the invention.

SUMMARY OF THE INVENTION

The present invention is directed to a fluid flow control valve which is mechanically programmable so as to enable the control of the flow rate and/or timing of the supply of fluid therethrough. The valve comprises a housing having an inlet portion for receiving fluid and an outlet portion for emitting fluid, a means associated with the housing to define an axially extending passageway in fluid communication with the inlet portion and the outlet portion, and a fluid flow control means disposed within the axially extending passageway. The fluid flow control means is configured to travel along at least a portion of the axially extending passageway when fluid is supplied to the passageway. The fluid flow control means is also configured, at a location remote from the inlet portion, to cooperate with the outlet portion to control the flow rate of fluid therethrough. Scheduled control, or timing, of a supply of a predetermined flow rate of fluid through the nozzle is accomplished by a cam and cam follower cooperating to delimit at least one path of travel of the fluid flow control means along the axially extending passageway. One of the cam and cam followers is associated with the housing and the other of the cam and cam followers is associated with the fluid flow control means. To enable the flow control means to traverse the defined path(s) of travel, a biasing means associated with the fluid flow control means is provided for enabling the fluid flow control means to move in a direction toward the outlet portion when fluid from the inlet portion comes into contact with the same.

In another embodiment of the present invention, the fluid flow control means comprises a valve head connected to a hollow cylinder. The hollow cylinder is configured to travel along at lest a portion of the axially extending passageway with the valve head when fluid is supplied to the passageway. The hollow cylinder with the valve head travels along a pathway defined by a cam associated with the housing by means of a cam follower. Scheduled control or timing of the flow of fluid through the valve is determined by a rotating program ring incorporated into the housing. The rotating ring can have multiple ports which interact with a pin attached to a part of the fluid flow control means. Interaction between a port and the pin allows the fluid flow control means to prevent the flow of fluid from the valve. When the port is blocked by a tab, the pin is prevented from engaging the port and fluid passes out of the valve. Thus, the flow rate and/or the timing of the fluid can be controlled by rotating the ring about the axially extending passageway and/or by opening or closing the ports on the rotating ring.

In another embodiment, the variable programming valve may include a variable programming lever to control the flow rate and/or timing of fluid. In a first position, the lever permits the fluid flow control means to block or restrict the flow of fluid from the valve. In a second position the lever contacts the pin on the fluid flow control means and arrests the upward movement of the valve head to allow fluid to pass from the valve. An advantage of the variable programming lever allows the valve to be reprogrammed even when there is fluid pressure in the valve.

BRIEF DESCRIPTION OF THE DRAWINGS

FIG. 1 is a cross sectional view of one embodiment of the invention wherein the outlet from the valve is coaxial with an axially extending passageway and the fluid flow control means is configured with frustoconical surfaces which are capable of seating within the outlet opening to open and close the same.

FIG. 2 is a top view of the fluid flow control means of FIG. 1.

FIG. 3 is a top view of the preferred biasing means associated with the fluid flow control means to enable linear and rotational movement thereof along the passageway.

FIG. 5 is a partial cross section, magnified, of the circled area on the right hand side of the valve illustrated in FIG. 1.

FIG. 10 is a cross sectional view of another embodiment of the present invention with a variable rotating ring member wherein the outlet from the valve is coaxial with an axially extending passageway and the fluid flow control means is composed of a hollow cylinder with a valve stem and a valve head which is capable of being selectively positioned between a fully closed and a fully open position.

FIG. 11 is a cross sectional view of the fluid flow control means of FIG. 10 illustrating the valve stem and valve head connected to the hollow cylinder.

FIG. 12 is a top view of the variable programming ring and the tabs covering the ports.

FIG. 13 is a corner portion of the programmable valve illustrating a variable programming lever blocking a port to prevent the fluid flow control means from seating with the outlet opening.

DETAILED DESCRIPTION OF THE INVENTION

Figure 4:
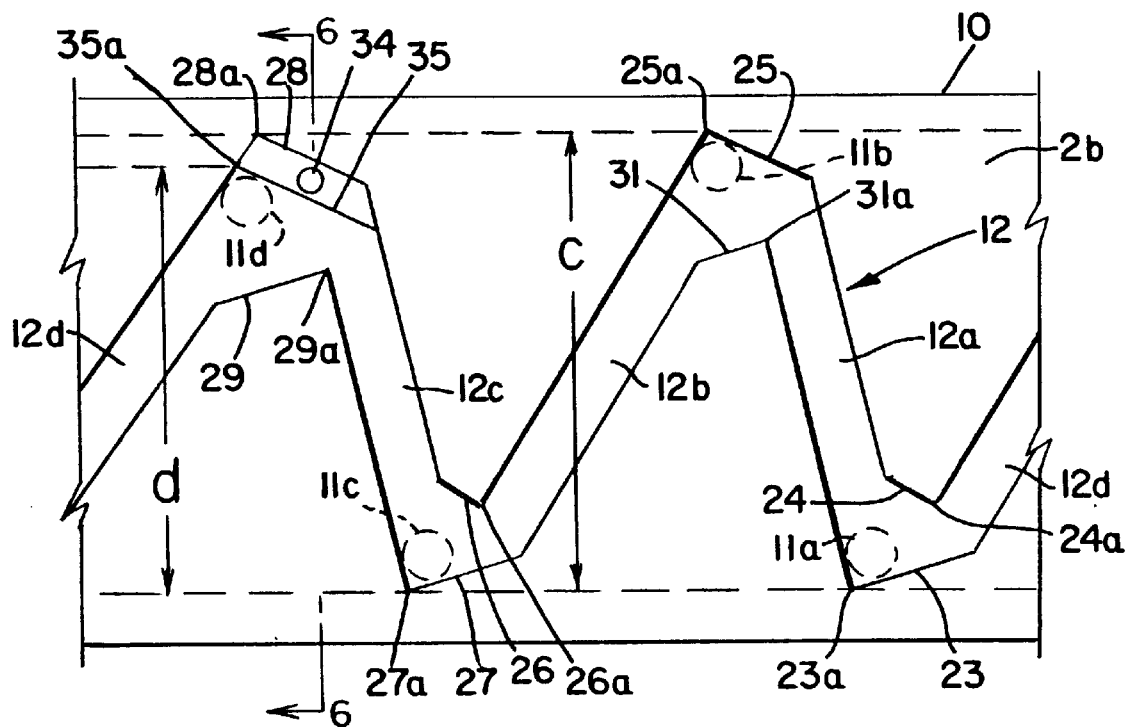
FIG. 4 is a view of the cam track provided in an insert associated with the housing, which track controls the sequence, or timing, or fluid flow through the outlet and, in conjunction with the fluid flow control valve, the flow rate of fluid therethrough.

A cross sectional view of a preferred embodiment of the present invention is illustrated in FIG. 1. The valve 1 includes a casing 2, made of any suitable material such as metal or plastic, in which is provided a generally cylindrical passageway defined by interior walls 2a and 2b. As is explained in more detail hereinbelow, the interior wall 2b is a surface of an insert 10, and the insert 10 is configured to fit in a cutout portion 2c formed in the internal wall of the casing 2. At one end of the casing 2 is a first end member 3 which defines an inlet to the interior of the valve. As illustrated, the first end member 3 is a removable end cap which may, for example, be attached to the casing by means of a threaded coupling arrangement. At the opposite end of the casing 2 is mounted an end member 4 into which is received an outlet piece 5. The outlet piece 5 is a hollow tubular member which is threadedly coupled to end member 4. The outlet piece 5 and the end member 4 can be attached in any suitable way, or the outlet piece may be an integral part of the end member 4. Similarly, the end member 3 can be provided with a separate piece defining the inlet, and the inlet and/or outlet pieces can define a male or female connection depending on the connection to be made to the fluid inlet or outlet mechanisms to which the valve inlet and outlet portions may be attached. Only one end member need be removable from the casing 2 as the objective of providing a removable end member is to provide access to the interior of the casing. When a threadable screw, separable end member is provided, preferably a gasket is incorporated, such as an O-ring 16, between the end member and the casing to produce a fluid tight seal, thereby preventing leakage of fluid from the valve. Although not illustrated, in one embodiment of the invention in which the valve is part of a water sprinkler head used for irrigation, the outlet member 5 may be provided with screw threads to which can be attached a nozzle which defines the flow pattern of the water to be supplied to plants. Attaching a sprinkler head to a valve in this manner is disclosed, for example, in U.S. Pat. No 5,372,306, the entire disclosure of which is hereby incorporated herein by reference.

Within the cylindrical cavity (or axially extending passageway) defined by walls 2a and 2b is disposed a fluid flow control means 6. As shown in FIG. 1, the fluid flow control means 6 is slidably received within the axially extending passageway for displacement along the longitudinal axis thereof, that is, the fluid flow control means travels along the passageway to move toward and away from the outlet piece 5, thereby controlling the flow rate of passing through the outlet. The fluid flow control means includes an end portion 14 configured with frustoconical surfaces or other configured surfaces designed to mate with the opening in outlet piece 5 to seal the opening and prevent fluid from flowing therethrough. The end portion 14 may contain through ports 22 for the passage of fluid from the interior of the fluid flow control means, which communicates with the inlet of the valve, to the exterior of the end portion of the fluid flow control means, thereby enabling fluid to pass through the outlet. As will be described more fully with respect to additional embodiments herein disclosed, the through ports 22 may be provided with removable inserts (illustrated in FIGS. 7 and 9) to aid in further controlling the flow rate of fluid through the outlet.

FIG. 2 is a top view of the fluid flow control means 6 illustrated in FIG. 1. As shown, the control means 6 is provided with an upper lip 18 (see, also, FIG. 1) which in combination with the lower portion of the frustoconical surface 14 defines a self centering seating surface 20 on which a biasing spring 13 (see FIG. 1) may be seated. The spring is optional, though preferable because the spring can not only assist in controlling the acceleration of the fluid flow control means 6 toward the outlet piece 5 when pressurized fluid is supplied to the valve, but also can aid in the separation of the fluid flow control means 6 from the outlet piece 5 when the supply of pressurized fluid to the valve is discontinued. As illustrated in FIG. 2, the frustoconical surface 14 is provided with a plurality of through ports 22, the size, shape and number of which are variable depending upon such factors as the desired flow rate, the preference to provide a balanced flow through the valve, the direction of flow and the pattern of fluid flow. The distance "a" illustrated in FIG. 2 is preferably at least sufficient to enable a portion of the frustoconical surface 14 to contact the outlet piece 5 to form a continuous, fluid tight seal therebetween, thus preventing fluid from being emitted through the outlet piece 5. Accordingly, through ports 22 preferably do not extend to a location within minimum distance "a" to interfere with the creation of a continuous seal between the frustoconical surface 14 and the outlet piece 5.

The material of construction of the fluid flow control means may be any suitable material such as metal or plastic, with the proviso that the material is compatible with the fluid with which it is intended to come into contact and is compatible with the casing material to enable relatively unconstrained sliding movement along the length of the passageway. Alternatively, and more preferably, in order to minimize any constrained movement of the fluid flow control means 6 along the length of the passageway, gaskets 17 and 21 are provided to eliminate direct contact between the fluid flow control means 6 and the internal walls 2a and 2b, and to provide contact surfaces generating relatively low friction forces and also to provide a fluid tight seal. The gaskets can be made of any suitable material such as polytetrafluoroethylene (PTFE) and the like. Providing a fluid tight seal also enhances the response time of the fluid flow control means 6 to the force of the pressurized fluid acting on the biasing means 9, as described in more detail below.

Movement of the fluid flow control means 6 along the length of the axially extending passageway is enabled by providing a biasing means 9. Biasing means 9 is at least one surface extending into the path of the fluid flow through the valve and responsive to the force being exerted thereagainst by the pressurized fluid supplied to the valve to cause the fluid flow control means 6 to travel along the axially extending passageway. As illustrated in FIGS. 1 and 3, a preferred biasing means is a turbine wheel configuration comprised of an outer ring 9a, a hub 9b and blades 9c interposed between the hub 9b and the outer ring 9a. The shape of the blades 9c, number of blades 9c and angle of displacement relative to the longitudinal axis of the passageway is variable depending upon such factors as the pressure of the fluid being supplied, the desired flow rate of fluid through the turbine, the spring constant of any biasing spring 13 utilized, the response time to movement of the fluid flow control means 6, the degree of rotation required by the design of the cam 12 and cam follower 11 arrangement, as more fully described herein below, and the stress being applied to the cam follower 11.

The biasing means 9 can be permanently or removably attached to the fluid flow control means by any of a variety of means. As illustrated, detents 26 spaced apart along the length of the longitudinal axis of the interior cavity of the fluid flow control means 6, a distance slightly greater than the height of the ring 9, may be provided on the inner surface of the fluid flow control means which, when employing a biasing means 9 having some degree of flexibility to enable it to be placed into position therebetween, may be sufficient to enable the biasing means 9 to be held in place without further assistance. Alternately, or in combination with the use of detents, though not illustrated, threaded ports may be provided through the fluid flow control means at an appropriate location for placement of the biasing means 9, and the biasing means, in turn, has a threaded receiving means which is in contact with the internal surface of the fluid flow control means such that a screw can be employed to effect securing the biasing means 9 to the fluid flow control means 6. In such an embodiment, a connection of the type illustrated in FIG. 5 with respect to affixing the cam follower 11 to the fluid flow control means 6 may also be used. To simplify the assembly of the biasing means 9 to the fluid flow control means 6, at least one detent formed on a surface of the fluid flow control means, at a location at which the biasing means is to be affixed, is preferable to assist in more quickly positioning the biasing means at the appropriate location for connection to the fluid flow control means.

The programmability of the valve 1 is accomplished by the movement of the fluid flow control means 6 along the pathways defined by the cooperation of the cam 12 and the cam follower 11. In the embodiments illustrated in FIGS. 1 and 6, the camming surfaces of the cam 12, i.e., the cam track, are defined in a removable insert 10 which seats on a corresponding cut out surface 2c provided in the casing 2. As described above, the insert 10 has an internal surface 2b which together with the surface 2a forms with the cylindrical internal cavity or axial passageway along which the flow control means 6 travels. The camming surfaces can extend either partially or entirely through the thickness of the insert 10. When extending entirely through the insert 10, the use of gaskets 17 and 21 may be utilized. The insert 10 is configured to be coextensive with the end of the casing 2 to which the end member 3 is attached. Using the insert 10 enables the program or sequence of travel of the fluid flow control means to be readily and easily modified. For example, when employed as a valve for an irrigation system, different inserts can be utilized in which the cam 12 traverses the entire camming surface over a 3, 5 or 7 day cycle, as more fully described hereafter.

FIG. 5 illustrates in more detail the cooperation of the cam follower 11 with the cam track 12 and a preferred method of attaching the cam follower 11 to the fluid flow control means 6. More specifically, the cam follower 11 is preferably removably attached to the fluid flow control means 6. Preferably, only a portion of the cam follower 11 is provided with threads to enable it to be threadedly received in the fluid flow control means. The surfaces of the cam follower 11 extending into and contacting surfaces defining the cam track 12 are, preferably, smooth to enable the cam follower to move essentially freely along the cam track. The cam follower 11 can be constructed of any suitable material that will enable it to withstand, for at least a reasonable period of time, the forces which are exerted upon the cam follower by the action of the pressurized fluid on the biasing means which causes the cam follower to move along the paths defined by the cam track. Preferably, the cam follower is composed of an elastic or flexible material, or at least a portion of the cam follower is composed of a flexible material, that allows the cam follower to ride and follow the different depths of the cam 12. The elastic or flexible cam follower insures that the fluid flow control means 6 can rotate in one direction only.

Referring now to FIG. 4, an embodiment of the operation of the fluid flow control means will be more fully described. A portion of a cam track is illustrated with the cam track 12 being defined in and extending only a portion of the way through the thickness of the insert 10. The cam track 12 is a continuous track having a plurality of pathways identified in FIG. 4 as 12a, 12b, 12c, and 12d. The number and configuration of pathways (in particular, but not exclusively, the length of the pathway, illustrated as "c" in FIG. 4) can vary depending upon the program to be affected by the fluid flow control means traversing all the pathways. The number of pathways provided by the cam track will delimit the number of cycles through which the fluid flow control means 6 travels as the cam follower 11 completes one rotation of the circumference of the interior surface of the insert 10. As used herein, one cycle is defined as the displacement of the fluid flow control means 6 from the first location along the axially extending passageway, determined by the position of the cam follower 11 in the cam track 12 (indicated as 11a), to a second location along the axially extending passageway in which the fluid flow control means 6 illustrated, for example, in FIG. 1 moves into contact with the outlet piece 5, as evidenced by movement of the cam follower 11 along the cam track 12a to a position shown as 11b, to a third location along the axially extending passageway in which the fluid flow control means is displaced from the outlet piece 5 in a direction opposite the direction traversed by the fluid flow control means 6 during the movement of the cam follower 11 from the position 11b along the cam track 12b to the position 11c. As illustrated, the third location of the fluid flow control means is dictated by the position of the cam at 11c.

FIG. 4 illustrates a 2 cycle program, wherein the first cycle is as described in the preceding paragraph and the second cycle would consist of travel of the fluid flow control means 6 along the axially extending passageway by movement of the cam follower 11 from a first location defined by the location of the cam follower at 11c along cam track pathway 12c to a second location defined by the position of the cam follower 11 at 11d, and then to a third location defined by the movement of the cam follower 11 along the cam tract 12d to the position 11a. This 2 cycle program may, for example, represent a program designed to provide water to a plant on an "every other cycle" basis. In the embodiment illustrated, the dimensions of the portion of the cam 12 delimiting the first cycle, defined by camming tracks 12a and 12b and surfaces 23, 24 and 25, are the same as those of the portion of the cam 12 defining the second cycle, defined by camming tracks 12c and 12d and surfaces 26, 27 and 28. In order to achieve the function of providing water to a plant on an every other cycle basis a stop insert 33 is placed within a portion of the cam defining the second cycle as illustrated in the cross section of FIG. 6 taken along line 6—6 of FIG. 4. Stop insert 33 is removably attached so as to contact surface 28 by, for example, a screw 34. Insert 33 is provided with a planar surface 35 approximately parallel to the contact surface 28 which the cam follower 11 contacts during travel through the second cycle in the absence of the stop insert 33. The effect of the stop insert 33 is to reduce the length of the cam track 12c relative to the length of cam track 12a to a lesser amount "d". Accordingly, during the first cycle the end portion 14 of fluid control means 6 is brought into a fluid tight sealing arrangement with the outlet of outlet piece 5, having moved a distance "c". During the second cycle the end portion 14 remains spaced apart from the outlet because the fluid flow control means moves a lesser distance "d", thereby enabling water to flow though the outlet piece 5 and be supplied to the plant or desired zone. The stop inserts provide yet another means in which the valve can be programmed without the need for several insertable members each defining a different program.

Upon removal of the force applied to the biasing means 9 by the pressurized fluid, the cam surfaces of the cam 12 facilitate movement of the cam follower 11 to the next cam track with little or no risk of the cam follower sliding back into the preceding track. To accomplish this goal, as illustrated in FIG. 4, the junctures 24a, 31a, 26a and 29a are displaced along the circumference of the surface 2b relative to the position of the junctures 23a, 25a, 27a and 28a (and 35a) such that axial movement by the fluid flow control means toward to the next location (first to second, second to third, etc.) will result in the cam follower 11 contacting a surface configured to cause the cam follower to proceed into the appropriate cam track, the surfaces being identified in FIG. 4 as 24, 31, 26 and 29. The surfaces 24, 31, 26 and 29 need not be planar surfaces but can take any shape which accomplishes the same purpose.

Figure 6:
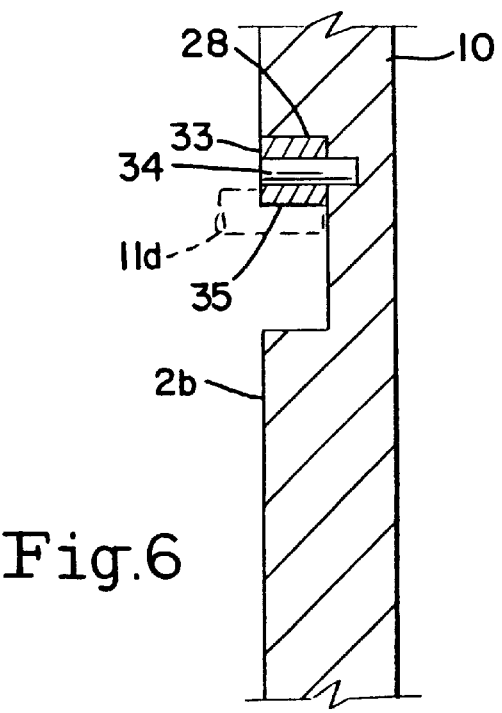
FIG. 6 is a cross sectional view of an insert mountable in the track illustrated in FIG. 4 and useful to change the sequence and/or flow rate of fluid through the outlet.
Figure 7:
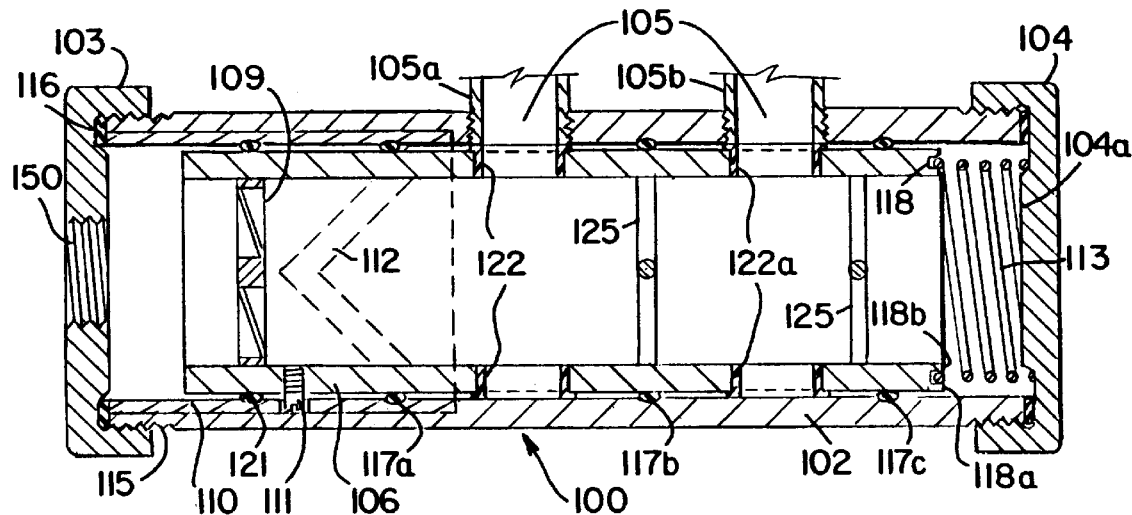
FIG. 7 is a cross sectional view of another embodiment of the present invention, wherein a plurality of outlets are provided in a sidewall along the length of a valve and the fluid flow control means is configured to provide openings in the sidewall thereof which, as the control means traverses the paths defined by the sequencing track as illustrated, for example, in FIG. 4, the outlets can be opened, closed, or partially opened.
Figure 8:
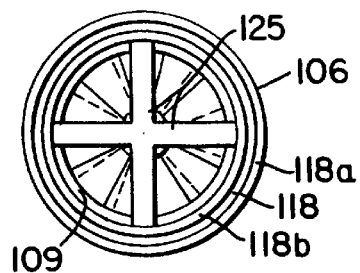
FIG. 8 is a top view of the fluid flow control means illustrated in FIG. 7, showing stiffening members which may be provided therein.
Figure 9:
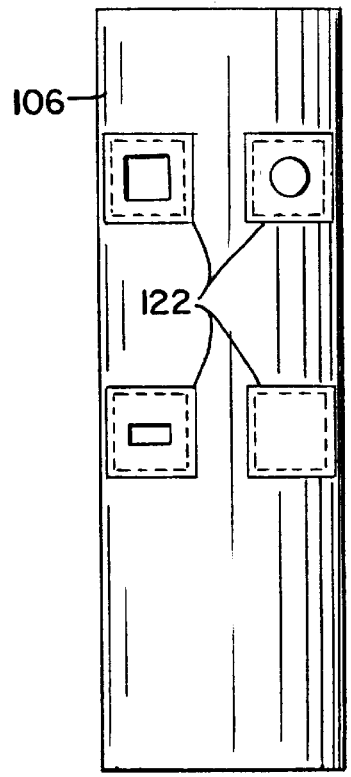
FIG. 9 is a side view of the fluid flow control means illustrated in FIG. 7, showing the provision of flow rate control inserts which may be fitted into the opening defined in a side wall of the fluid flow control valve.

FIGS. 7 through 9 illustrate another embodiment of the invention. Valve 100 comprises a valve casing 102 which is a hollow cylinder. Provided in the walls of the casing 102 are two outlets 105 into which are threadedly received an outlet piece 105a and 105b. At one end of the casing is end cap 103 provided with a through port 150 defining an inlet for fluid to be supplied to the interior of the valve. As in the embodiment described with reference to FIG. 1, the end cap may be an integral part of the valve or may be removably connected as illustrated in the drawing. At the other end of the casing 102 is end cap 104. Because the outlets 105 are provided in the walls of the casing, the end cap 104 has no fluid outlet and functions to close the end of the casing. As in FIG. 1, the embodiment illustrated in FIGS. 7–9 includes an insert 110, the configuration and operation of which is the same as illustrated and described with respect to FIGS. 1 and 4–6 above. The valve 100 includes a fluid flow control means 106. As with the fluid flow control means illustrated and described with respect to FIG. 1, the fluid flow control means is biased by a biasing means 109, the configuration and operation of which are defined with respect to FIGS. 1 and 3.

The fluid flow control means 106 in the embodiment illustrated in FIG. 7 is provided with through ports in the sidewalls thereof. The through ports, designated as ports 122 and 122a are arranged not only along the length of the fluid flow control means but also around the circumference thereof to enable a wide range of programming opportunities depending upon the cam configuration and location and size of the through ports. In order to enhance the programmability of the valve of this embodiment, removable inserts may be provided in the through ports to modify the configuration thereof and consequently the program performed by the movement of the fluid flow control means 106 through the cycles defined by the cooperation of cam 112 and cam follower 111. The inserts illustrated in FIG. 7 at through ports 122 and in more detail in FIG. 9 can not only provide for different throughport shapes but also enable the selective closure of the ports to allow independent control of fluid flow through each outlet 105.

Because of the length of the fluid flow control means 106 and the through ports through the walls thereof, preferably, stiffening members 125 are provided at one or more locations along the longitudinal axis thereof. FIG. 8 is a top view of a suitable stiffening member design.

Also illustrated in FIG. 8 is the configuration of the surface 118 of the fluid flow control means 106. Preferably, spring 113 is employed to assist the fluid flow control means to move in a direction toward the inlet 150. Seating of the spring 113 is accomplished by raised surfaces 118a and 118b formed as spaced apart concentric circles. Cooperating with surface 118 to insure the spring is properly arranged in the valve is raised surface 104a of end member 104 around which the end of a helical spring may be disposed as illustrated in FIG. 7.

As the cam follower traverses a given cycle, the through ports 122 come into or move out of alignment (full or partial) with the outlets 105 defined in the outlet pieces 105a, 105b to control the flow of fluid therethrough. Although only two outlets are illustrated, any number of outlets can be provided to suit the particular needs of the application for which the valve is used. The embodiment illustrated in FIG. 7 can be utilized to supply fluid to one or more zones of, for example, an irrigation field and avoid the costs associated with using electrically actuated valving systems. The embodiment as illustrated in FIG. 7 can readily be used in combination with the embodiment illustrated in FIG. 1 to mechanically control the irrigation of a field.

Another embodiment of the present invention is illustrated in FIG. 10. Valve 201 includes a casing 203, made of any suitable material such as metal or plastic, in which is provided a cylindrical passageway defined by interior walls 203a and 203b. As explained in more detail hereinbelow, the interior wall 203b is a surface of insert 205, and the insert 205 is configured to fit in a cutout portion 203c formed in the internal wall of the casing 203. At one end of the casing 203 is a first end member 207 which defines an inlet to the interior of the valve. As illustrated, the first end member 207 is a removable end cap which may, for example, be attached to the casing by means of a threaded coupling arrangement. At the opposite end of the casing 203 is mounted end member 209 into which is received an outlet piece 211. In the embodiment of FIG. 10, the outlet piece 211 is a hollow tubular member which is threadedly coupled to the end member 209. The outlet piece 211 and end member 209 can be attached in any of a variety of known ways or the outlet piece may be provided as an integral part of the end member 209. Similarly, the end member 207 may be provided with a separate piece defining the inlet. The inlet and/or outlet pieces can define a male or female connection depending on the connection to be made to the fluid inlet or outlet mechanisms to which the valve inlet and outlet portions may be attached. Only one end member need be removable from the casing 203 as the objective of providing a removable end member is to provide access to the interior of the casing. When a threadable screw, separable end member is provided, preferably a gasket is incorporated, such as 0ring 213, between the end member and the casing to produce a fluid tight seal, thereby preventing leakage of fluid from the valve. Although not illustrated, the outlet member 211 may be provided with screw threads to which a nozzle can be attached to define the flow pattern of a fluid to a particular zone.

A fluid flow control means 215 is disposed within the cylindrical cavity (or axially extending passageway) defined by walls 203a and 203b. As illustrated in FIG. 10, the fluid flow control means 215 is slidably received within the axially extending passageway for displacement along the longitudinal axis thereof, thereby controlling the flow rate of the fluid passing through the outlet. The fluid flow control means includes an end portion or head 215a configured to mate with the outlet in outlet piece 211 to seal the opening and prevent fluid from flowing therethrough.

FIG. 11 is a side view of the fluid flow control means 215 illustrated in FIG. 10. As illustrated, the top of the control means 215a is provided with an upper lip 215b which assists in providing a fluid tight seal with the outlet piece 211, and on which a biasing spring 221 may be seated. The spring is optional, though preferable, because the spring does not only assist in controlling the acceleration of the fluid flow control means 215 toward the outlet 211 when pressurized fluid is being supplied to the valve, but also aids in separating the fluid flow control means 215 from the outlet piece 211 when the supply of pressurized fluid to the valve is discontinued.

The head of the fluid flow control means 215a is connected to a valve stem 215c by any suitable means. The head 215a of the fluid flow control means can also be integrally connected to the valve stem 215c as illustrated in FIG. 11. The valve stem 215c is connected to a hollow cylinder 219. Any suitable means can be employed to connect the valve stem 215c to the hollow cylinder 219. The fluid flow control means illustrated in FIG. 11 is connected to the hollow cylinder 219 by means of cross bars 215d and 215e. The cross bars may be an integral part of the valve stem as shown in FIG. 11, or the cross bars may be separate from the valve stem. Although not illustrated, the cross bars 215d and 215e may have screw threads at their ends for attachment to the hollow cylinder by means of screws 215d2 and 215c2 which pass through screw holes located in the sides of the hollow cylinder 219.

As discussed above, the fluid flow control means may be any suitable material that is compatible with the fluid with which it is intended to come in contact with and which enables relatively unconstrained sliding movement along the length of the passageway. However, in order to minimize any constrained movement of the fluid flow control means 215 along the length of the passageway, gaskets 213 are provided to eliminate direct contact between the hollow cylinder 219 of the control means 215 and the internal walls 203a and 203b, and to provide contact surfaces generating relatively low friction forces. The gaskets also provide a fluid tight seal as in the embodiment described above and illustrated in FIG. 1.

Movement of the fluid flow control means 215 along the length of the passageway is enabled by providing a biasing means as described and illustrated in the embodiment of FIG. 1. Also, the biasing means can be any suitable structure on the fluid control means 215 such as a fin, wing or blade, that causes the fluid flow control means to rotate in one direction during movement when fluid pressure is applied. As illustrated in FIG. 11, the biasing means are fins 212 attached to the inner surface of the hollow cylinder. The shape of the fins, the number of fins and angle of displacement relative to the longitudinal axis of the passageway is variable depending upon such factors as the pressure of the fluid being supplied, the desired flow rate of fluid through the turbine, the spring constant of any biasing spring 221 utilized, the response time to movement of the fluid flow control means, the degree of rotation required by the design of the cam 231 and cam follower 219b arrangement, as more fully described herein below, and the stress being applied to the cam follower 219b. The fins 212 can be permanently or removably attached to the hollow cylinder 219 by any suitable means. Though not illustrated, threaded ports may be provide through the fins for screwing the fins into the inner surface of the hollow cylinder 219.

The programmability of the valve 201 is accomplished by the movement of the fluid flow control means 215 along the pathways defined by the cooperation of the cam 231 and the cam follower 219b as discussed in the previous embodiments illustrated in FIGS. 1 and 7. In the embodiment illustrated in FIG. 10, the programmability of the valve is accomplished by variable programming ring 223. The variable programming ring 223 is connected to the casing 203 of the valve 201, and is rotatable in at least one direction about the central axis of the valve 201. The variable programming ring 223 can be engaged to the casing by any suitable means. The variable programming ring 223 can be attached to the casing by a tongue and groove or a ratchet mechanism and the like. The casing 203 is in two pieces such that the variable programming ring 223 can be removed and replaced with a different programming ring.

FIG. 12 shows one embodiment of the variable programming ring 223 having a groove which coincides with a tongue (not illustrated) on the casing 203 such that the ring can be rotated to engage different flow rates and/or timing programs for a given zone. The programming ring illustrated in FIG. 12 is an example of a manually operated ring. Ports or holes (not illustrated) penetrate the variable programming ring to allow fluid to pass toward outlet piece 211. Tabs 225 block the travel of programming ring when the pin 219a engages the variable rotating program ring 223. When one or more tabs are removed, the ring is free to rotate and moves up the cam guided by cam follower 219b. Since there is no tab to block the pin, the valve head 215a comes to rest in the outlet piece 211. The upper lip 215b of valve head 215a helps seal the outlet piece 211 and water does not flow out of the valve. When one or more tabs remain in place, the pin is prevented from mating with the hole and the vertical movement of the valve stem is restrained and the valve head 215a will not rest in the outlet piece 211. Since outlet piece 211 is not blocked by the valve head 215a, fluid flows through the outlet piece 211. As the fluid source is turned on and off, the cam follower moves the fluid control means horizontally such that the pin 219a situated on the hollow cylinder 215 moves to the next tab site. The number of the tab sites and thus the number of program positions can vary. The variable programming ring 223 in FIG. 12 shows a 4 track valve actuator. When the fluid is turned on and off four times, the actuator will be back to the original position. Each actuation by the fluid will rotate the actuator 90 degrees mechanical. Thus, FIG. 12 illustrates two program positions A and B. Accordingly, the variable programming ring embodiment can control the flow rate and/or timing of fluid by two means. The variable programming ring can be rotated to a different position and the tabs can be removed or replaced to change the pattern of fluid flow from the valve.

The cooperation of the cam follower 219b with the cam track 231 disclosed in FIG. 10 has the structure as disclosed in FIG. 5. The cam follower 219b is preferably removably attached to the fluid flow control means 215. Preferably, only a portion of the cam follower 219b is provided with threads to enable the cam follower to be threadedly received in the fluid flow control means. The surfaces of the cam follower 219b extending into and contacting surfaces defining the cam track 231 are, most preferably, smooth to enable the cam follower to move essentially freely along the cam track. The cam follower 219b can be constructed of any suitable material that will enable the cam follower to withstand, for at least a reasonable period of time, the forces which are exerted upon it by the action of the pressurized fluid on the biasing means which causes the cam follower to move along the paths defined by the cam track. Preferably, the cam follower is composed of an elastic or flexible material that allows the cam follower to ride and follow the different depths of the cam. Such material insures that the mechanism can rotate in one direction.

The cam track of the embodiment disclosed in FIG. 10 may have the same construction as disclosed in FIG. 4. However, insert stop 33, as illustrated in FIGS. 4 and 6, is not necessary to program the flow rate and/or the timing of the fluid flow through the valve. The embodiment illustrated in FIGS. 10 and 11 employs the variable programming ring and pin to control flow rate and timing. A portion of a cam track is illustrated in FIG. 10 with the cam track 231 being defined in and extending only a portion of the way through the thickness of the insert 205. The number and configuration of pathways as discussed above is variable depending upon the desired program. The number of pathways provided by the cam track will delimit the number of cycles through which the fluid flow control means travels as the cam follower completes one complete rotation of the circumference of the interior surface of the insert 205. As discussed above in reference to FIG. 4, a cycle is defined as the displacement of the fluid flow control means 215 from a first location along the axially extending passageway distal to outlet piece 211, to a second location along the axially extending passageway in which the fluid flow control means 215 moves proximal to or into contact with the outlet piece 211, to a third location along the axially extending passageway in which the fluid flow control means is displaced from the outlet piece 211 in a direction opposite the direction traversed by the fluid flow control means 215 during the movement of the cam follower 219b from the initial position along the cam track.

In another embodiment of the present invention, a programming lever can be employed to control the flow of fluid and/or timing. The number of levers can vary depending on the desired program. FIG. 13 illustrates one embodiment employing levers to program the valve. In place of the variable programming ring with removable tabs as illustrated in FIG. 12, a stationary ring structure 305 having programming levers 303 can be used to control the flow of fluid from the valve. The tabs can be programmed while there is fluid pressure in the valve.

As shown in FIG. 13, each programming lever 303 is connected to the housing 203 of the valve by means of a non-rotatable or stationary ring structure mount 305. The stationary ring structure 305 can be a separate structure from the housing 203, or the ring 305 can be an integral part of the housing. Each lever is attached to the mount by any suitable means which allows the levers to rotate about their axis 307. When arm 303b of lever 303 is in a down position, the pin 219a of the flow control means 219 is blocked from entering a hole provided in programming ring 223 when a tab 225 covering the opening is removed and the valve head 215a does not mate with valve outlet 211 and fluid flows from the valve. Arm 303b of lever 303 is secured over the hole by means of applying manual force to arm 303a, and locking the lever in place. Any suitable means for locking the lever in place can be employed such as a stop or a clamp (not illustrated). When arm 303a of the lever is rotated about 90° to open the hole, the pin mates with the hole on the up-cycle of the fluid flow control means. Since the lever does not block the pin, the valve head 215a of the fluid flow control means comes to rest on the outlet 211 to block the flow of fluid.

Having described the preferred embodiments in sufficient detail to enable one skilled in the art to practice the same, several modifications and alterations thereto are apparent without departing from the scope of the invention. Accordingly, the above descriptions are intended to illustrate but not limit the scope of the invention to less than that which is defined by the appended claims.

What is claimed is:

1. A flow control valve, comprising:
   a) a housing having an inlet portion for receiving fluid and an outlet portion for emitting fluid;
   b) a means associated with the housing to define an axially extending passageway in fluid communication with the inlet portion and the outlet portion;
   c) a fluid flow control means disposed within the axially extending passageway, configured to travel along at least a portion of the axially extending passageway when fluid is supplied to said passageway, and configured at a location remote from the inlet portion to cooperate with the outlet portion to control the flow of fluid therethrough;
   d) a cam and cam follower cooperating to delimit at least one path of travel of the fluid flow control means along the axially extending passageway, one of said cam and cam follower being associated with the housing and the other of said cam and cam follower being associated with the fluid flow control means, said fluid control means having a plurality of locations along an axis at which the cam follower may be affixed; and
   e) a biasing means associated with the fluid flow control means for enabling the fluid flow control means to move in a direction toward the outlet portion when fluid from the inlet portion comes into contact with the same.

2. The fluid flow control valve of claim 1, wherein the biasing means comprises at least one surface defined by means associated with the fluid flow control means and configured to enable the fluid flow control means to travel along at least a portion of said at least one path of travel when contacted with fluid supplied through the inlet portion.

3. The fluid flow control valve of claim 1, wherein the axially extending passageway is a cylindrical passageway defined in the housing and has a longitudinal axis extending from the inlet portion to the outlet portion and wherein the fluid flow control means comprises a cylindrical hollow member arranged within the axially extending passageway of the housing and slidable along at least a portion of the length thereof.

4. The fluid flow control valve of claim 3, wherein the cylindrical passageway is defined by a member having a through passage extending along the length thereof and defining the cylindrical internal passageway, said member being removably attached to the housing and having the cam follower defined in surfaces of the member defining the cylindrical internal passageway.

5. The fluid flow control valve of claim 1, wherein the cam follower is provided on a removable member defining at least a portion of the axially extending passageway.

6. The fluid flow control valve of claim 1, wherein return means are associated with the fluid flow control means and arranged to bias the fluid flow control means in a direction toward the inlet portion.

7. The fluid flow control valve of claim 6, wherein the return means comprises resilient means exerting upon the fluid flow control means a force which functions to perform said biasing action and is capable of being modified to control the force of the bias.

8. The fluid flow control valve of claim 1, wherein the cam comprises a plurality of surfaces associated with one of the housing or fluid flow control means to define at least a first path of travel of the fluid flow control valve in a direction toward the outlet portion and a second path of travel of the fluid flow control means in a direction of travel toward the inlet portion.

9. The fluid flow control valve of claim 8, wherein the plurality of surfaces defining at least said first and second paths of travel are connected to one another at one end thereof so as to define a contiguous route of travel of the fluid flow control means from one path to the next.

10. The fluid flow control valve of claim 8, wherein the plurality of surfaces are recessed surfaces and wherein, at a location along at least one path of travel, path altering means are provided for changing the length of at least one path and thereby altering the flow of fluid through the outlet portion.

11. The fluid flow control valve of claim 1, wherein the cam comprises a plurality of surfaces associated with one of the housing or fluid flow control means to define at least a first path of travel of the fluid flow control value in a direction toward the outlet portion and a second path of travel of the fluid flow control means in a direction of travel toward the inlet portion and wherein the fluid flow control means is caused to rotate while the cam follower traverses at least one of the first and second paths.

12. The fluid flow control valve of claim 1, wherein a surface defined in a portion of the fluid flow control means is configured to mate with a surface defined in the outlet portion to prevent fluid from flowing through the outlet portion when the fluid flow control means has traveled a predetermined distance along the axially extending path in response to fluid supplied to the inlet portion.

13. The fluid flow control valve of claim 12, wherein the outlet portion is a throughport defined in a radially extending surface of the housing.

14. The fluid flow control valve of claim 12, wherein the outlet portion comprises a throughport arranged substantially concentric with the axially extending passageway for emitting fluid.

15. The fluid flow control valve of claim 1, wherein the cam follower is removably connected to the housing.

16. The fluid flow control valve of claim 1, wherein the cam follower comprises a means removably attached to a throughport defined in the housing and wherein said means includes at least one surface configured to cooperate with a tool useful to detach said means from said housing.

17. A water flow control assembly, comprising:
   a) a housing having an inlet portion for receiving fluid and an outlet portion for emitting fluid;
   b) a means arranged in the housing and defining an axially extending passageway in fluid communication with the inlet portion and the outlet portion;
   c) a fluid flow control means disposed within the passageway, configured to travel along at least a portion of the axially extending passageway when fluid is supplied to the passageway, and configured at an end thereof remote from the inlet portion to cooperate with the outlet portion to control the flow of fluid therethrough;

d) a cam and cam follower cooperating to delimit the path of travel of the fluid flow control means along the axially extending passageway, one of said cam and cam follower being associated with the housing and the other of said cam and cam follower being associated with the fluid flow control means;

e) biasing means associated with the fluid flow control means for moving the fluid flow control means in a direction toward the outlet portion when fluid from the inlet portion comes into contact with the same; and f) port means associated with the inlet portion and defining a predetermined flow pattern for water passing from the outlet portion therethrough.

18. The water flow control assembly of claim 17, wherein the port means is removably connected to the inlet portion.

19. A fluid flow control valve, comprising:

a) a housing having an inlet portion for receiving fluid and an outlet portion for emitting fluid;

b) means associated with the housing to define an axially extending passageway in fluid communication with the inlet portion and the outlet portion;

c) fluid flow control means disposed within the axially extending passageway, configured to travel along at least a portion of the axially extending passageway when fluid is supplied to said passageway, and configured at a location remote from the inlet portion to cooperate with the outlet portion to control the flow of fluid therethrough;

d) a cam and cam follower cooperating to provide a path of travel of the fluid flow control means along the axially extending passageway, the cam being associated with the housing and the cam follower being associated with the fluid flow control means; and e) a variable programming means associated with the housing to cooperate with the fluid flow control means to delimit at least one path of travel of the fluid flow control means along the axially extending passage way.

20. The fluid flow control valve of claim 19, wherein the variable programming means comprises a rotating program ring having a plurality of ports to cooperate with a pin associated with the fluid flow control means such that the fluid flow control means engages the outlet portion when fluid enters the fluid flow control valve and prevents the fluid from passing out of the said outlet portion.

21. The fluid flow control valve of claim 20, wherein at least one port of the plurality of ports of the rotating program ring is blocked by a tab to prevent the pin of the fluid flow control means from engaging the at least one port to delimit at least one path of travel of the fluid flow control means along the axially extending passageway and prevent the fluid flow control means from engaging the outlet portion such that the fluid flow control valve emits fluid.

22. The fluid flow control valve of claim 19, wherein the variable programming means comprises a plurality of ports and a removable insert associated with each port of the plurality of ports to delimit at least one path of travel of the fluid flow control means along the axially extending passageway.

23. The fluid flow control valve of claim 19, further comprising a biasing means associated with the fluid flow control means for enabling the fluid flow control means to move in a direction toward the outlet portion when fluid from the inlet portion comes into contact with the same.

24. The fluid flow control valve of claim 23, wherein the biasing means comprises at least one surface configured to enable the fluid flow control means to travel along at least a portion of said path of travel when contacted with fluid supplied through the inlet portion.

25. The fluid flow control valve of claim 19, wherein the cam comprises a plurality of surfaces associated with one of the housing or fluid flow control means to define at least a first path of travel of the fluid flow control valve in a direction toward the outlet portion and a second path of travel of the fluid flow control means in a direction of travel toward the inlet portion.

26. The fluid flow control valve of claim 19, wherein the cam comprises a plurality of surfaces associated with the housing to define at least a first path of travel of the fluid flow control valve in a direction toward the outlet portion and a second path of travel of the fluid flow control means in a direction of travel toward the inlet portion and wherein the fluid flow control means is caused to rotate while the cam follower traverses at least one of the first and second paths.

27. The fluid flow control valve of claim 19, wherein a surface defined in a portion of the fluid flow control means is configured to engage a surface defined in the outlet portion to prevent fluid from flowing through the outlet portion when the fluid flow control means has traveled a predetermined distance along the axially extending path in response to fluid supplied to the inlet portion.

28. The fluid flow control valve of claim 19, wherein the fluid flow control means comprises a valve head, valve stem and a hollow cylinder, said valve stem joins the valve head to the hollow cylinder such that the valve head, valve stem and the hollow cylinder move in association through the axially extending passageway during operation of the valve.

29. The fluid flow control valve of claim 28, wherein the cam follower is associated with a side surface of the hollow cylinder to cooperate with the cam in the housing to provide a path of travel for the fluid flow control means along the axially extending passageway.

30. The fluid flow control valve of claim 29, wherein a pin is associated with a top surface of the hollow cylinder to cooperate with a plurality of ports in the variable programming means to delimit at least one path of travel of the fluid flow control means along the axially extending passageway.

* * * * *